United States Patent [19]
Winter

[11] 3,888,515
[45] June 10, 1975

[54] TRAILER HITCH MECHANISM

[76] Inventor: Charles M. Winter, 2580 W. Philadelphia St., York, Pa. 17404

[22] Filed: Jan. 16, 1974

[21] Appl. No.: 433,666

Related U.S. Application Data

[62] Division of Ser. No. 314,952, Dec. 14, 1972, Pat. No. 3,834,735.

[52] U.S. Cl. ............................. 280/476 R
[51] Int. Cl.² ............................. B60D 7/00
[58] Field of Search ........... 280/495, 491 R, 491 E, 280/490 R, 479 R, 406 A; 296/23 MC

[56] References Cited
UNITED STATES PATENTS

| | | | |
|---|---|---|---|
| 2,460,466 | 2/1949 | Nogle | 280/476 R |
| 2,570,482 | 10/1951 | Pruitt | 280/476 R |
| 2,592,219 | 4/1952 | West et al. | 280/476 R |
| 2,850,293 | 9/1958 | Hall | 280/491 E |
| 2,889,155 | 6/1959 | Sandage | 280/491 E |
| 3,658,376 | 4/1972 | Dodgen | 296/23 MC |

*Primary Examiner*—Leo Friaglia
*Assistant Examiner*—R. Schrecengost
*Attorney, Agent, or Firm*—C. Hercus Just

[57] ABSTRACT

Hitch mechanism for attaching a trailer to the rear portion of a passenger-type motor vehicle, the hitch mechanism including auxiliary frame means preferably detachably but firmly interconnectable to the rear portions of the chassis frame members of a motor vehicle and including a transverse frame member which supports a ball-type hitch member midway thereof. Auxiliary supporting wheels are connected to the auxiliary frame means to augment the support for a trailer provided by the conventional rear wheels of the motor vehicle and also minimize whiplash and sidesway of the trailer while being towed.

1 Claim, 5 Drawing Figures

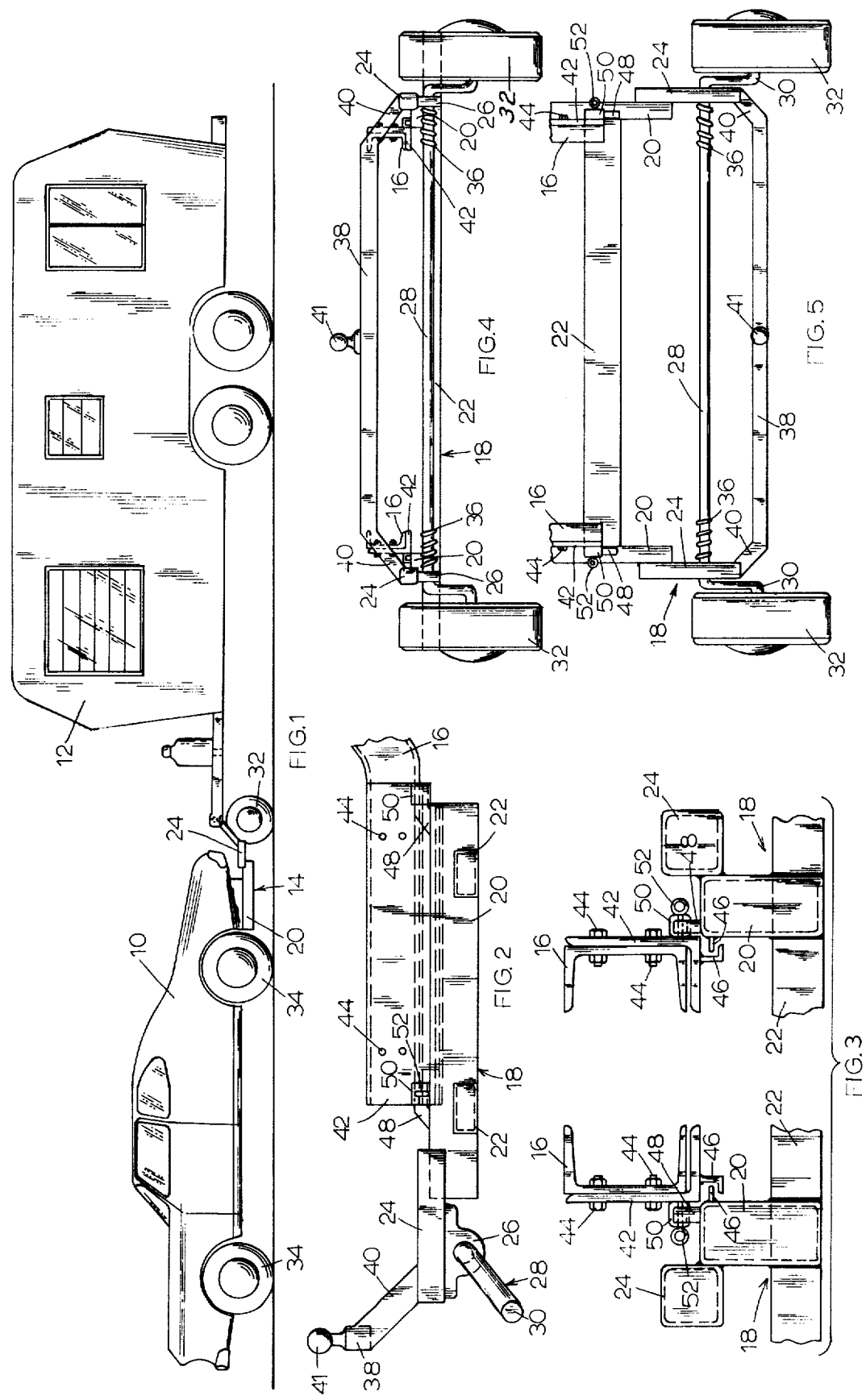

TRAILER HITCH MECHANISM

This application is a Division of Ser. No. 314,952, filed Dec. 14, 1972 now U.S. Pat. No. 3,834,735.

BACKGROUND OF THE INVENTION

Many devices have been developed heretofore by which trailers are connected to motor vehicles, especially of the passenger type, whereby the trailer is supported by the rear portion of the vehicle and is towed thereby. At present, there is a prevailing tendency for trailers to be larger and heavier than heretofore, thereby placing greater strain upon the rear wheels and tires of the vehicle, as well as the rear springs of the vehicle. Such situations also tend to induce whiplash of the towed trailer, which is a dangerous condition.

The greater weight of modern trailers for passenger vehicles has led to the development of supplemental frames to be connected to the rear portions of the passenger vehicles, rather than merely attach the ball hitch to the rear bumper of the vehicle as was commonly done with the use of lighter weight trailers. Examples of such frame means comprise the subject matter of U.S. Pat. No. 2,176,878, issued Oct. 24, 1939 to D. D. Arehart, and U.S. Pat. No. 2,889,155, issued June 2, 1959 to N. R. Sandage.

For purposes of relieving the load of the front end of a trailer from the rear wheels and springs of a vehicle, a number of devices have been developed previously, known as trailer hitch dollies, examples of which are the subject matter of U.S. Pat. Nos. 2,302,246, issued Nov. 17, 1942 to A. R. Nelson; 2,460,466, issued Feb. 1, 1949 to J. E. Nogle; and 2,592,219, issued Apr. 8, 1952 to L. R. West et al. While the structures shown in these prior patents serve limited purposes relative to affording better trailer connections and offering limited additional support for the front end of trailers when attached to vehicles, such as passenger type automobiles, it has been found that they can be improved upon to provide better supporting and connecting means for trailers to be connected to automotive passenger-type vehicles for the additional purpose of providing greater driving and towing stability and preventing whiplash. The present invention provides such improvements, as explained in detail hereinafter.

SUMMARY OF THE INVENTION

It is the principal object of the present invention to provide a ball-type trailer hitch adapted to be attached to the rear portion of the chassis of a passenger type motor vehicle by utilizing an auxiliary frame which is firmly connectable to the chassis channel members of the vehicle and including a transverse frame member positioned rearward of the rear bumper of the vehicle to support a ball hitch member midway thereof, and a pair of auxiliary wheels attached to said auxiliary frame to augment the support provided for the trailer by the rear wheels and springs of the vehicle and also stabilize the vehicle and trailer against any appreciable sidesway or whiplash.

It is another object of the invention to provide quick operable locking means by which the auxiliary frame is secured detachably but firmly to the chassis members of the vehicle.

It is a further object of the invention to provide durable spring means connected between said auxiliary frame and an axle for said auxiliary wheels to permit said wheels to yield relative to road conditions similarly to the normal rear wheels of the vehicle to which a trailer is hitched.

It is still another object of the invention to dispose at least the midportion of said transverse frame member substantially in vertical alignment with the axes of said auxiliary wheels and above the same to position the ball hitch member in vertical alignment with said axes.

Details of the foregoing objects and of the invention, as well as other objects thereof, are set forth in the following specification and illustrated in the accompanying drawing comprising a part thereof.

BRIEF DESCRIPTION OF THE DRAWING

FIG. 1 is a side elevation of a conventional passenger-type automotive vehicle to the rear end of which a trailer hitch mechanism embodying the present invention is connected and to which an exemplary trailer is connected.

FIG. 2 is a fragmentary side elevation of the trailer hitch shown in FIG. 1, on a larger scale than in FIG. 1, and illustrating attaching members by which the hitch is connected to the chassis frame members of the vehicle.

FIG. 3 is a fragmentary rear view, partly broken away to foreshorten the view, and illustrating details of the attaching members and the means by which portions of the auxiliary frame of the trailer hitch are connected detachably thereto.

FIG. 4 is a rear elevation of the trailer hitch per se shown in FIG. 1 but illustrated on a larger scale than in FIG. 1.

FIG. 5 is a fragmentary top plan view of the trailer hitch shown in the preceding figures and illustrating the vertical alignment of the ball hitch member with the axes of the auxiliary wheels.

DETAILED DESCRIPTION

The principal purpose of the hitch mechanism comprising the present invention is to provide firm support for auxiliary wheels connected to the rear portion of the chassis frame members of automotive vehicles by means of an auxiliary frame which preferably is firmly but detachably connected to said chassis frame members for supporting a ball hitch member to which a trailer is connected by conventional means, the auxiliary wheels being restricted to vertical movement only. Such mechanism is a substantial improvement over conventional trailer dollies in that much greater stability for the trailer is provided to prevent sidesway and whiplash, largely due to the much more firm connection of the trailer hitch mechanism to the vehicle than has been provided heretofore in relation to auxiliary supporting wheels.

Hence, the invention essentially comprises the assembly of integrated and interconnected elements, including an auxiliary frame, auxiliary wheels supported thereby, a cross-member which supports the ball hitch member substantially in vertical alignment with and above the axes of said wheels, and particularly, attaching brackets which are firmly connected directly to the rear portion of the chassis members of an automotive vehicle and to which attaching members on said auxiliary frame are rigidly but preferably detachably connected, thereby comprising a combination of elements capable of producing the beneficial results set forth in detail above and hereinafter. Details of such structure and the operation and use thereof are as follows:

The exemplary automotive vehicle 10 is illustrated as a sedan but may be any other type of automotive vehicle, especially of a passenger type. The exemplary trailer 12 is of the house type which provides sleeping and living accommodations but the invention may be used with other types of trailers such as those used to transport certain types of boats and similar objects. The invention concerns the trailer hitch mechanism assembly 14 which is connected to the rear portions of the channel-type chassis members 16 of the vehicle 10 which are shown in cross-section in FIG. 3 and fragmentarily in FIGS. 2 and 5.

The trailer hitch mechanism assembly 14 which comprises the present invention consists of auxiliary frame 18 which comprises a pair of relatively short connecting members 20 which are transversely spaced apart, as best shown in FIGS. 3–5, and for convenience, as well as strength, may be formed from rectangular tubing of suitable wall thickness, such as shown in exemplary manner in the end view comprising FIG. 3. The connecting members 20 extend in substantially parallel manner to the chassis member 16 and are maintained in desired spaced relationship by a pair of similar cross-members 22 which, also for convenience, may be formed from rectangular tubing of suitable gauge as illustrated in FIG. 2. Welding may be employed to effect the connection of the members 20 to the cross-members 22.

Auxiliary frame 18 also comprises a pair of horizontal extensions 24 which, in cross-section, are illustrated as being formed from substantially square tubing of appropriate wall thickness. The forward ends of the extensions 24 are connected, such as by welding, rigidly to the rearward end portions of the connecting members 20. Other cross-sectional shapes may be used, if desired, however. The horizontal extensions 24 respectively support bearing brackets 26, which receive the opposite end portions of auxiliary axle 28, the terminal ends 30 of which are laterally offset from the central portion, as best shown in FIGS. 2, 4 and 5, to comprise direct supports for the auxiliary wheels 32. In the operative position, the offset terminal ends 30 extend downward and rearward from the central portion of the axle 28, as illustrated in FIG. 2 in exemplary manner. As can be seen from FIG. 1, the auxiliary wheels 32 preferably are of a smaller diameter than the conventional wheels 34 of the vehicle 10. The wheels 32 also are flexibly mounted with respect to the hitch assembly 14 in order to permit the wheels to sustain road shock and yield when obstructions are encountered. Such flexible mounting is provided in the form of coiled springs 36, which are connected at one end to the axle 28 and at the opposite end, they are fixed to the horizontal extensions 24. The strength rating of the springs 36 is adequate to enable the wheels 32 to provide substantial auxiliary or supplemental support for the forward end of the trailer 12 when connected to the hitch assembly 14, and thereby spare the conventional wheels 34 and the rear springs of the vehicle 10 from being required to provide all support for the forward end of the trailer 12 that is necessary, for example, when a conventional trailer ball hitch is attached directly to the rear bumper or frame of the car without providing auxiliary wheel support.

The trailer hitch assembly 14 also includes an important element in the form of a transversely extending support bar 38 which, as seen from FIG. 4, is disposed at an elevation above the level of other elements of the trailer hitch assembly 14 and, as seen in FIG. 5, the central portion of the support bar 38 is substantially in vertical alignment with the terminal ends 30 of axle 28 which support the auxiliary wheels 32. The opposite ends 40 of the support bar 38 extend downward and forward from the central portion thereof, as best seen from FIG. 2, and the lower terminal portions of said ends 40 are connected, such as by welding to the rearward ends of the horizontal extensions 24. Mounted midway between the opposite ends of the support bar 38 is a conventional ball hitch member 41, which, as clearly shown in FIG. 5, is substantially within a vertical plane intersecting the terminal ends 30 of the auxiliary axle 28, thereby disposing the weight of the forward end of the trailer 12 directly above the axes of the auxiliary wheels 32.

Another important feature of the present invention comprises the provision of means by which the auxiliary frame 18, and especially the auxiliary wheels 32 which are supported thereby, are connected firmly but preferably detachably to the rear portion of the chassis members 16 of the vehicle 10. This is accomplished specifically by providing attaching brackets 42 which, as shown especially in FIG. 3, comprise sections of structural angles. The vertical flanges and the outer faces of the chassis member 16 are drilled similarly to accommodate a plurality of connecting bolts 44 which fixedly connect the attaching brackets 42 to the chassis frame members 16. The horizontal flanges of the brackets 42 preferably are lowermost and horizontal. Extending downward from the lower faces of the horizontal flanges of the brackets 42 are smaller angles 46, which provide outwardly open horizontal channels which receive appropriate aligning ribs 46, which respectively are connected, such as by welding, to the upper portions of the inner faces of connecting members 20, as clearly shown in FIG. 3.

Additional connecting means between the auxiliary frame 18 and the attaching brackets 42 are provided in the form of a pair of similar lugs 48, which are connected to the upper surfaces of the connecting members 20 at longitudinally spaced locations as best shown in FIG. 2. Said lugs have forwardly extending terminal ends which respectively are received within horizontal sockets 50, which are fixedly connected, such as by welding, to the lower portions of the outer vertical faces of the attaching brackets 42. Locking pins 52 are provided to extend through aligned holes in at least one set of the lugs 48 and sockets 50 at each side of the auxiliary frame. The pins 52 may be spring-pressed inwardly by suitable conventional means so as to comprise quick-operable locking means to prevent accidental separation of the auxiliary frame 18 from the attaching brackets 42 on the chassis members 16 of the vehicle 10.

From the foregoing, it will be seen that the auxiliary frame 18 and the auxiliary wheels 32 supported thereby are quickly attachable to and disconnectable from the rear portion of the vehicle 10 simply by manipulation of the locking pins 52. Accordingly, when the auxiliary frame 18 has been disconnected from the vehicle 10, the attaching brackets 42 are substantially hidden from view, and thus, present no objectionable appearance from any comparable vehicle not supplied with the attaching brackets 42 and other elements of the invention. Also, due to the rigid connection of attaching brackets 42 to the chassis members 16 of the vehicle 10 and the firm, but preferably detachable, connection of the connecting members 20 of the auxiliary frame 18 to brackets 42, the auxiliary wheels 32 will be forced to track behind the rear wheels 34 of vehicle without sidesway or whiplash. Such firm connection also disposes the ball hitch member 41 in precisely fixed relation to vehicle 10 under all conditions of operation and, in conjunction with the steadying effect of wheels 32, which can only yield vertically, further contributes to the aforementioned stabilization of the trailer connection and towing thereof without whiplash.

While the invention has been described and illustrated in its several preferred embodiments, it should be understood that the invention is not to be limited to the precise details herein illustrated and described since the same may be carried out in other ways falling within the scope of the invention as illustrated and described.

I claim:

1. A hitch mechanism for attaching a trailer to the rear end of an automotive vehicle having chassis frame members and providing stable support for the front end of such trailer, said mechanism comprising in combination:
   a. a pair of attaching bracket members adapted to extend respectively along the rearward portions of the chassis frame members of said vehicle,
   b. means adapted to connect said members fixedly to said chassis frame members respectively along one surface thereof,
   c. an auxiliary frame detachably connected to said attaching bracket members and including a pair of substantially parallel connecting members respectively comprising opposite side members of said auxiliary frame which also includes an auxiliary axle extending between and interconnected to said connecting members for support thereby,
   d. auxiliary wheels supported by the opposite ends of said auxiliary axle,
   e. spring means connected between said axle and connecting members to absorb shock imposed upon said wheels,
   f. transverse members extending substantially horizontally in use between and fixed to said connecting members,
   g. one of said transverse members having opposite ends respectively extending downward and forward in use from the transverse intermediate portion thereof and said ends being fixedly connected to said connecting members, whereby the transverse intermediate portion of said one transverse member normally is positioned above and substantially within a common vertical plane extending through the axes of said auxiliary wheels, and
   h. a hitch connecting pivot for a trailer supported by said one of said transverse members intermediately between the ends thereof to dispose it vertically above the axes of said auxiliary wheels.

* * * * *